United States Patent Office 3,139,670
Patented July 7, 1964

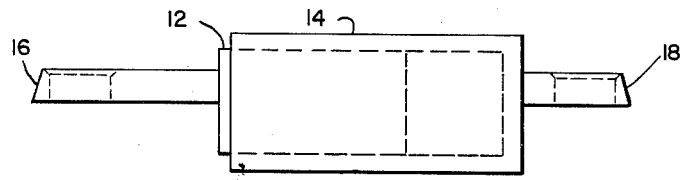
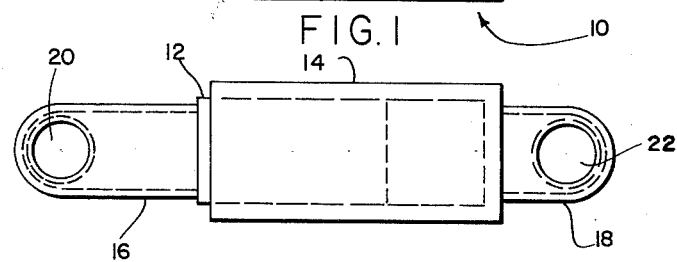
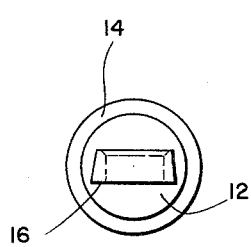
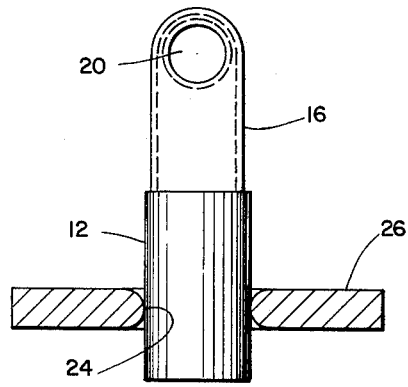
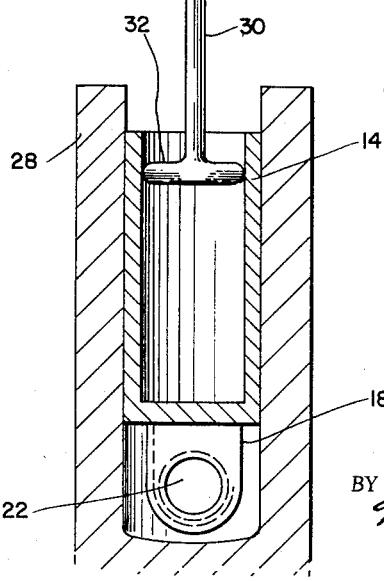

3,139,670
PROCESS FOR MAKING A DASHPOT ASSEMBLY
Peter D. George, 31 Channing St., Quincy, Mass.
Filed June 19, 1961, Ser. No. 118,040
1 Claim. (Cl. 29—156.4)

This invention relates in general to dashpot assemblies and more particularly concerns an improved dashpot damping device manufactured by a novel process which greatly increases the useful life of the device.

Damping devices particularly miniature precision units, normally are designed to operate within certain critical limits and it is important that working tolerances be maintained as close to specification as possible so that the desired damping effect will be achieved. It is of equal importance that the tolerances remain substantially unchanged despite repeated use of the device so that the damping effect will remain constant over an extended period.

Heretofore, precision dashpot assemblies of the piston and cylinder type have been manufactured by conventional machining techniques in which the parts are cut to size on a lathe, for example, and subsequently lapped or honed so as to produce a smooth finish and close fit between working surfaces.

Other dashpots have incorporated adjustable valving components into the piston or cylinder to control the flow of the damping medium so that the damping effect may be altered within certain limits after final assembly.

This latter measure unnecessarily complicates an otherwise simple device while a dashpot made by the former method involves some rather slow, painstaking operations and the end product of both processes do not display particularly outstanding wearing characteristics.

Accordingly, it is an object of the present invention to provide a dashpot assembly which is characterized by a long useful life.

Another object of this invention is to provide a novel process for hardening the working surfaces of a dashpot assembly.

Yet another object of this invention is to provide a simple method for simultaneously sizing the parts of the assembly and re-orienting the grain structure of the wearing faces of the parts into hard, homogeneous surfaces having excellent wearing characteristics.

More particularly, this invention features a dashpot assembly in which the bearing surfaces of the piston and cylinder are work hardened prior to assembly by subjecting selected surfaces of both components to high compressive forces. Typically, this may be done by passing the piston axially through a restricted circular opening formed in a hard metal die. The inner walls of the cylinder may be work hardened by driving an enlarged punch down through the cylinder which should be outwardly harnessed.

But these and other features of the invention, along with further objects and advantages thereof will become more readily apparent from the following detailed description taken in connection with the accompanying drawings in which:

FIG. 1 is a view in side elevation of a damping device made according to the invention, FIG. 2 is a top plan view of the device shown in FIG. 1, FIG. 3 is an end view of the FIG. 1 device, FIG. 4 is a view in side elevation, partly in section, showing the piston in the process of being work hardened, and, FIG. 5 is a view similar to FIG. 4 but showing the cylinder in the process of being work hardened.

Referring now to the drawings, the reference character 10 generally indicates a dashpot assembly comprising a piston 12 mounted for reciprocation within a cylinder 14. Both parts may be machined from brass or other ductile material which, when mechanically deformed, becomes progressively more resistant to deformation. Both parts are formed with a pair of connecting lugs 16 and 18 extending from opposite ends with the lugs drilled through near their ends to form openings 20 and 22 for connection with whatever movable members are to be provided with damping control.

It will be understood that the damping provided during a compression stroke of the piston is utilized for the damping control although damping action is also produced as the piston retracts. The amount of damping provided by any one dashpot is generally dependent upon the clearance between the walls of the piston and those of the cylinder since the damping medium must flow between these two surfaces upon reciprocation of the piston. For certain miniature dashpots in which the diameter of the piston may be in the order of .215 of an inch the tolerances may run between .000025 to .00005 of an inch. Any substantial increase in such tolerances would obviously impair the effectiveness of the dashpot by completely altering its damping characteristics.

While the parts may be machined to close tolerances and lapped to a smooth surface it has been found that the relatively soft brass parts wear rather rapidly and must be replaced at frequent intervals. However, by pre-hardening the working surfaces of the two parts, it is possible to extend substantially the service life of the dashpot.

In FIG. 4 the piston 12 is shown in the process of having its cylindrical walls work-hardened by being forced through a restricted, smoothly rounded, circular opening 24 formed in an annular die 26 of highly polished carbide. It will be understood that the diameter of the opening 24 is slightly smaller than the outside diameter of the piston 12 so that the piston will be radially compressed as it is passed through the die. By subjecting the piston to this compressive force, the grain structure of the metal, particularly at the surface, will be reoriented in such a manner that a homogeneous bearing surface of very high hardness is produced. At the same time, the piston's final dimensions will be precisely established with no additional cutting or lapping required.

In FIG. 5 there is illustrated an apparatus for hardening the inner walls of the cylinder 14. The apparatus includes a receptacle 28 in which the cylinder 14 is mounted. There is very little clearance between the inner walls of the receptacle 28 and the outer walls of the cylinder 14 so that the receptacle, in effect, serves as a harness for the cylinder during the wall hardening operation. With the cylinder mounted as shown, a punch, 30 having an enlarged rounded head 32 of highly polished carbide, is forced down into the cylinder 14, compressing the cylinder walls and hardening their surfaces. The harnessing provided by the receptacle 28 prevents the cylinder from expanding under the pressure of the head 32 which is slightly larger than the inside diameter of the cylinder.

As before, the surface hardening step simultaneously imparts the finished dimensions to the piece, thereby avoiding further shaping operations.

Prior to assembly of the two parts, it is desirable to lubricate the bearing surfaces by wiping them with a silicon treated tissue and then burnishing them with molybdenum disulphide. A small amount of molybdenum disulphide may also be added to the dashpot assembly at the bottom of the cylinder.

While the invention has been described with particular reference to the illustrated embodiment, it will be understood that a number of modifications may be made by those skilled in the art without departing from the invention.

Having thus described my invention, what I claim and desire to obtain by Letters Patent of the United States is:

The method of manufacturing a dashpot assembly comprising the steps of,
- (a) machining a piston and cylinder from ductile material to approximate size,
- (b) mounting the machined cylinder in a close fitting harness to restrain the outer walls of the cylinder,
- (c) driving axially through the open end of the cylinder a punch of a material harder than said piston and cylinder and having a rounded circular head slightly larger than the cylinder opening,
- (d) forcing said piston through a restricted circular opening of a hardened metal annulus,
- (e) coating the walls of said piston and cylinder with silicon,
- (f) burnishing the walls of the cylinder with molybdenum disulphide,
- (g) finally assembling said piston within said cylinder.

References Cited in the file of this patent

UNITED STATES PATENTS

| | | |
|---|---|---|
| 671,559 | Lindstrom | Apr. 9, 1901 |
| 1,402,508 | Lothrop | Jan. 3, 1922 |
| 1,407,320 | Bouché | Feb. 21, 1922 |
| 1,784,866 | Fahrenwald | Dec. 16, 1930 |
| 1,929,739 | Gannett | Oct. 10, 1933 |
| 1,940,694 | Ped | Dec. 26, 1933 |
| 2,018,392 | Willink | Oct. 22, 1935 |
| 2,040,324 | Moore | May 12, 1936 |
| 2,244,954 | Lenz et al. | June 10, 1941 |
| 2,424,087 | Focke et al. | July 15, 1947 |
| 2,778,094 | Whitney | Jan. 22, 1957 |

OTHER REFERENCES

The Making, Shaping and Treating of Steel, U.S. Steel, 2 ed. 1957, p. 689.